United States Patent [19]

Dalziel

[11] Patent Number: 4,663,687
[45] Date of Patent: May 5, 1987

[54] MAGNETIC TAPE DRIVE WITH IMPROVED TAPE TO HEAD COMPLIANCE

[75] Inventor: Warren L. Dalziel, Monte Sereno, Calif.

[73] Assignee: Microtek Storage Technology, San Jose, Calif.

[21] Appl. No.: 624,015

[22] Filed: Jun. 25, 1984

[51] Int. Cl.⁴ .................... G11B 15/62; G11B 15/66
[52] U.S. Cl. .................. 360/130.32; 360/130.31; 360/130.3
[58] Field of Search .......... 360/130.31, 130.3, 130.32, 360/130.33, 130.34, 130.2, 130.21–130.24; 226/195

[56] References Cited

U.S. PATENT DOCUMENTS 2,603,721 7/1952 Camras .......................... 360/130.31
4,320,429 3/1982 Knerich et al. .................. 360/130.2
4,477,851 10/1984 Dalziel et al. ...................... 360/132

OTHER PUBLICATIONS

Balcezak et al., "Dual-Magnetic Head Pad," IBM Technical Disclosure Bulletin, vol. 18, No. 8, Jan. 1976, p. 2399.
Bond, "Pressure Pad for Magnetic Heads," IBM Technical Disclosure Bulletin, vol. 6, No. 9, Feb. 1964, pp. 57–58.

Primary Examiner—John H. Wolff
Assistant Examiner—Matthew J. Bussan
Attorney, Agent, or Firm—Bogucki, Scherlacher, Mok & Roth

[57] ABSTRACT

Tape-to-head compliance in a bidirectional magnetic tape drive is substantially improved in both directions by pivotally mounting the pressure pads. Friction between the moving tape and the pressure pads causes the pads to rotate slightly, the leading portions of the pressure pads thereby exerting greater pressure on the tape than the trailing portions.

3 Claims, 7 Drawing Figures

MAGNETIC TAPE DRIVE WITH IMPROVED TAPE TO HEAD COMPLIANCE

This invention relates generally to magnetic tape drives of the type used as storage devices in digital computer systems and more particularly to mechanisms for improving compliance between the tape and the magnetic head assemblies of such drives.

Magnetic tape drives of the kind designed to function principally as backups for rigid disk memories of the Winchester type normally operate in a continuous streaming mode in which a multiple track tape is moved at constant speed past a pair of read/write heads. For a variety of reasons, most notably the speed and efficiency of data transfer derived from a serpentine track format, streaming tape drives are designed to operate bidirectionally. Either of the heads can be selected for reading or writing; typically, the write head is selected on the basis of tape direction so that the data can be read after writing thus providing an immediate error check.

One type of tape streamer incorporates magnetic head assemblies of the type used in single-sided floppy disk drives. In such assemblies the read/write gap is set apart in the direction of tape travel from a pair of tunnel erase gaps.

In a manner well known in the art, pressure pads are used to provide good compliance or data transfer relationship between the tape and the head assemblies. However, because of the gap separation and the fact that the tape can move in either direction past the heads, it is not possible to arrive at a single, fixed pressure pad location that provides optimum head-to-head compliance under all operating conditions. A variety of factors contributes to this, including the asymmetrical nature of the air film that develops between the moving tape and the head assembly.

SUMMARY OF THE INVENTION

Broadly, compliance is substantially improved in accordance with the present invention for either direction of tape motion by securing the pressure pads to carriers which are pivotally mounted. The friction between the moving tape and the pressure pads causes the pressure pad carriers to rotate slightly, the upstream or leading portions of the pressure pads thereby applying more pressure on the tape than the downstream or trailing portions. This has the effect of more completely squeezing out the film of air between the head surface and the tape to provide a substantial improvement in tape-to-head compliance. Because the pressure pad carriers are free to pivot in either direction this effect is realized irrespective of the direction of tape movement.

In accordance with a specific, exemplary embodiment of the present invention, there is provided a magnetic head assembly having a tape-engaging surface that includes magnetic transducer pole faces defining separate gaps for generating magnetic flux in the vicinity of the head surface. Appropriate means are provided for moving and guiding the magnetic tape for bidirectional travel along a tape path across the tape-engaging surface. A pressure pad confronting the tape-engaging surface of the magnetic head assembly is mounted on a support that resiliently biases the pad into contact with the magnetic tape to urge the tape into firm engagement with the tape-engaging surface. The pressure pad is pivotally mounted on the pad support and is free to rotate to either side of a central position through a small angular displacement. Friction between the moving tape and the pressure pad causes the pad to pivot slightly, the leading portion of the pad applying greater pressure to the tape tahn the trailing portion.

As will be evident from the foregoing and from the detailed description below, the invention has broader utility than in the context of the specific drive disclosed here and will find advantageous application wherever optimum tape-to-head compliance is required in a bidirectional tape drive.

BRIEF DESCRIPTION OF THE DRAWINGS

Other objects, features and advantages of the invention will become apparent from the following detailed description of the preferred embodiment taken in conjunction with the accompanying drawings in which.

DETAILED DESCRIPTION OF THE PREFERRED EMBODIMENT

Figure 4:
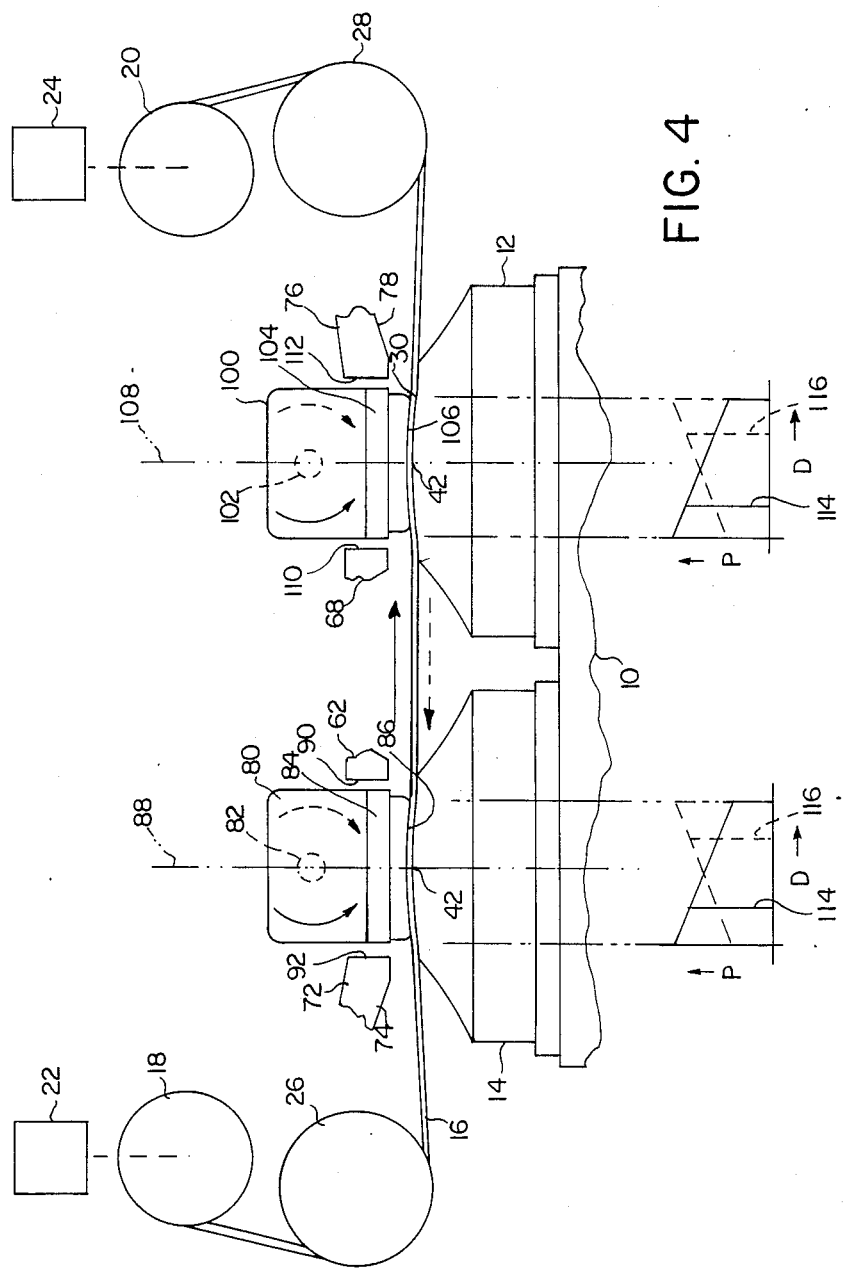
FIG. 4 is a plan view, showing in enlarged form a portion of the apparatus of FIG. 1, along with certain features of the tape path and tape drive shown in schematic form.
Figure 7:
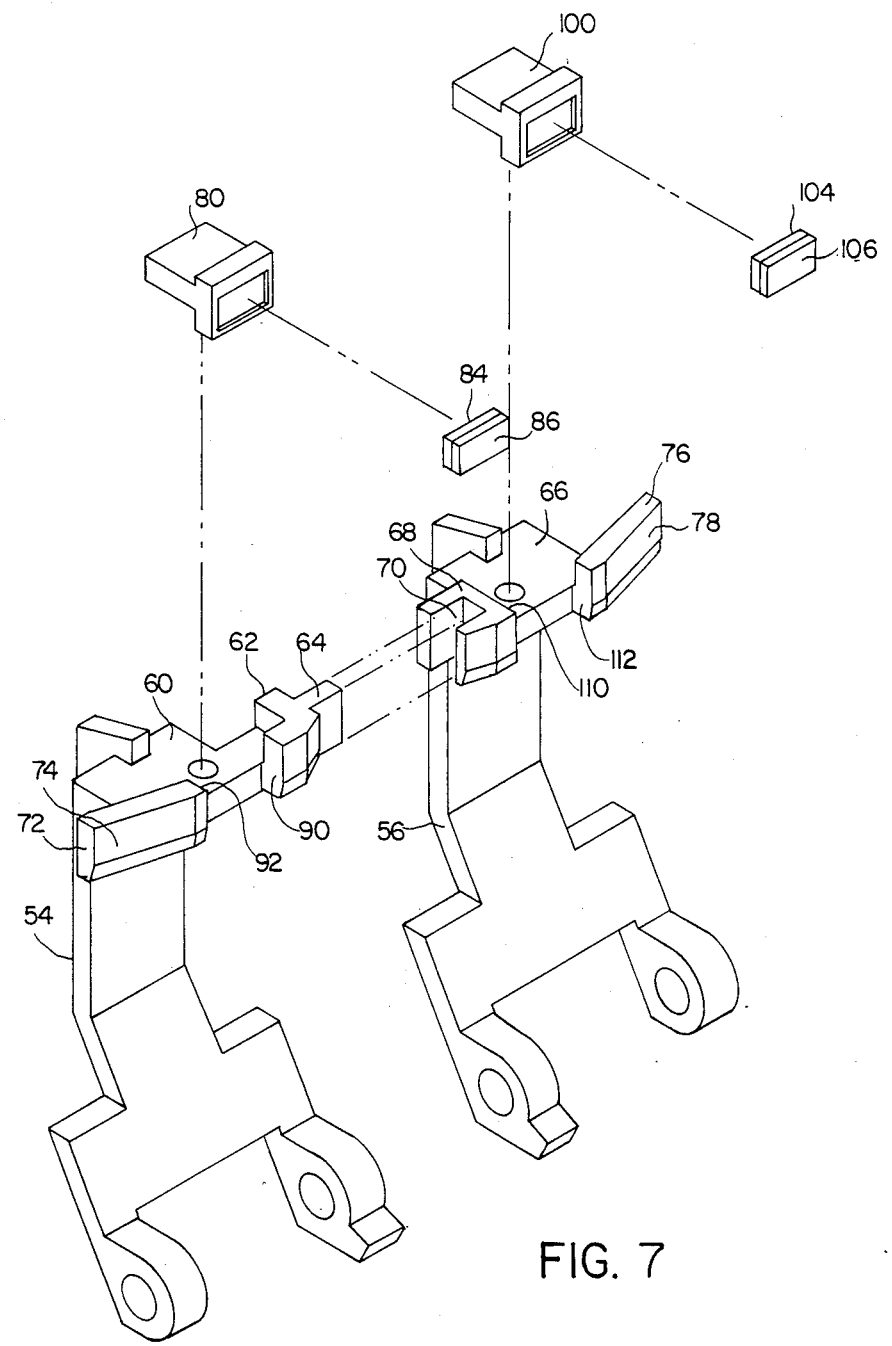
FIG. 7 is an exploded perspective view of the support arm assembly, pressure pad carriers and pressure pads in accordance with the invention.

With reference to the drawings there is shown a head carriage 10 supporting at one end thereof a pair of read/write head assemblies 12 and 14 mounted side-by-side in data transfer relationship with a magnetic tape 16 movable bidirectionally along a tape path shown in simplified and schematic fashion in FIG. 4. The tape 16 is transported between a supply reel 18 and a takeup reel 20 driven, respectively, by reel motors 22 and 24, and guided in its travel across the head assemblies by a pair of guide rollers 26 and 28.

The head carriage 10 is movable vertically, that is, in a direction transverse to the direction of tape travel, by a stepper motor and related control elements (not shown) to provide access to any of a number of parallel tracks on the tape. The two read/write head assemblies are thereby controlled to follow a serpentine, bidirectional track format which simultaneously provides a read-after-write error detection capability. Such systems, generally, are known in the art and reference is made to patent application Ser. No. 386,048 filed June 7, 1982, and entitled "Magnetic Data Storage And Drive Apparatus", now U.S. Pat. No. 4,477,851 issued Oct. 16, 1984, for additional details concerning these related structural features.

Figure 5:
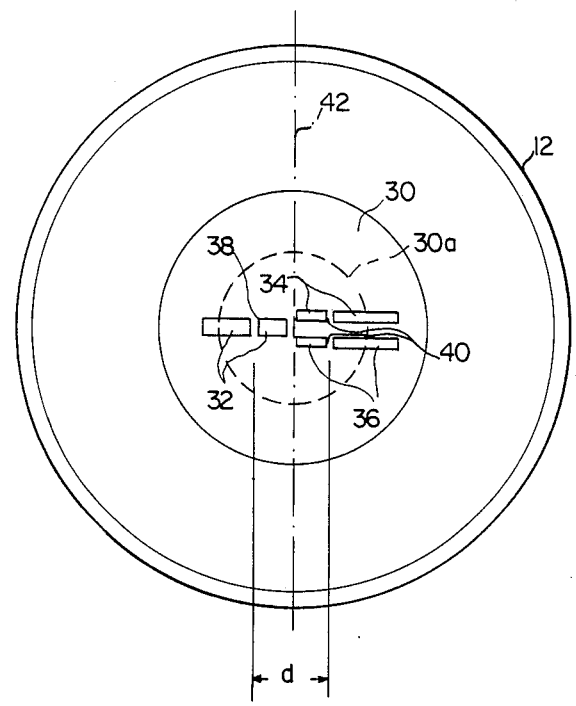
FIG. 5 is a front view of one of the magnetic head assemblies of the previous figures showing the structural details thereof.
Figure 6:
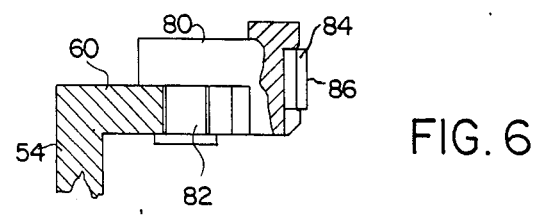
FIG. 6 is a side elevation view, partly in cross-section, of a pressure pad carrier and part of the support arm on which it is mounted.

FIGS. 4 and 5 show in somewhat greater detail certain relevant aspects of the magnetic head assemblies 12 and 14. The head assemblies, which are identical, each include a tape-engaging surface in the form of an apex 30 which, as best shown in the plan view of FIG. 4, has a generally spherical configuration. The guide rollers 26 and 28 are positioned relative to the head assemblies to provide a small degree of tape wrap about the curved apexes.

As already pointed out, the head assemblies illustrated here are well known in the magnetic disk memory technology having long been used in single-sided floppy drives. The advantages thereof in the context of a streaming tape drive are explained in the above-referenced patent application; suffice it to say that such heads are inexpensive and obviate the need to continuously monitor and control tape tension. The present invention, however, is not limited to use in conjunction with spherical heads and those skilled in the art will recognize the utility thereof in association with other types of heads, including flat heads and cylindrical heads of the style used for many years in digital tape transports.

The apex 30 incorporates three pairs of pole faces 32, 34 and 36, flush with the apex surface and defining, respectively, a read/write gap 38 and a pair of vertically aligned tunnel erase gaps 40. (FIG. 5).

The read/write gap 38, on the one hand, and the erase gaps 40, on the other, are symmetrically disposed relative to a vertical center line 42, the overall distance, d, separating the gap 38 and the gaps 40 in the direction of tape travel typically being of the order of 0.036 inch (0.9 mm). To minimize data transfer errors, the tape 16 must be maintained in intimate contact with the apex surface 30 at least in a central area 30a shown in broken lines in FIG. 5, encompassing the group of gaps 38 and 40. Despite tape wrap about the curved apex surface 30, there is a tendency for the tape to lift off that surface due to boundary layer and other aerodynamic phenomena, the effect of which is to introduce a film of air between the tape and the apex 30 particularly along the upstream or leading side of the apex relative to the center line 42, that is, the side from which the tape approaches. Since the tape can be driven in either direction, tape lift can potentially occur on either side of the center line 42 depending upon the direction of tape travel.

Figure 1:
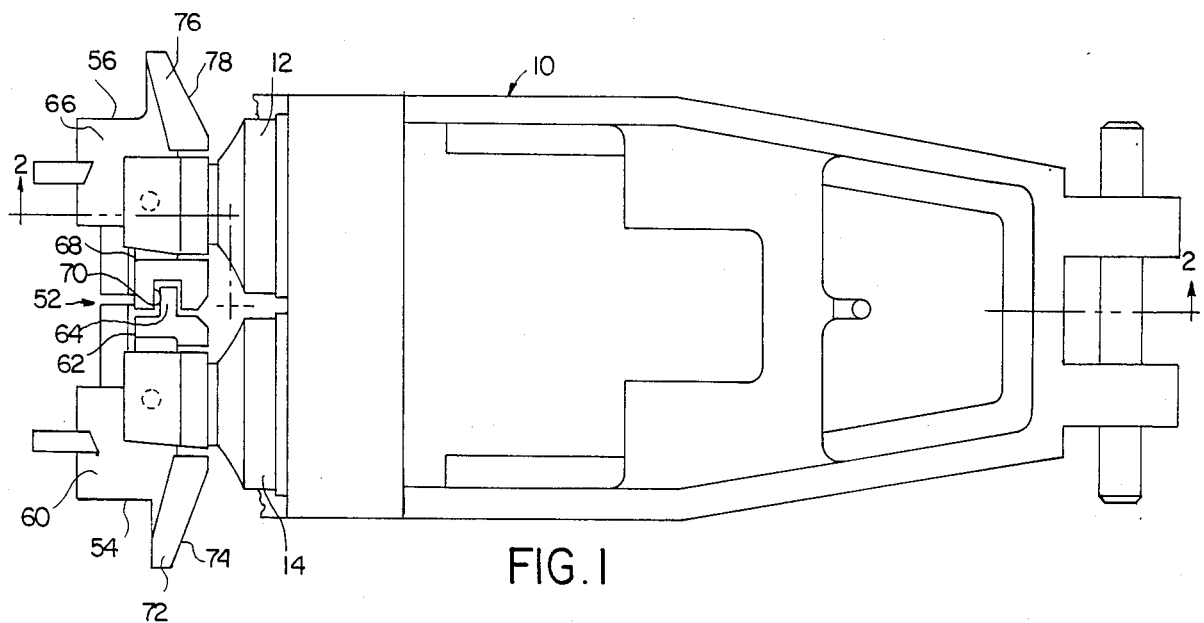
FIG. 1 is a plan view of a magnetic head assembly apparatus incorporating a pressure pad support mechanism in accordance with the present invention.
Figure 2:
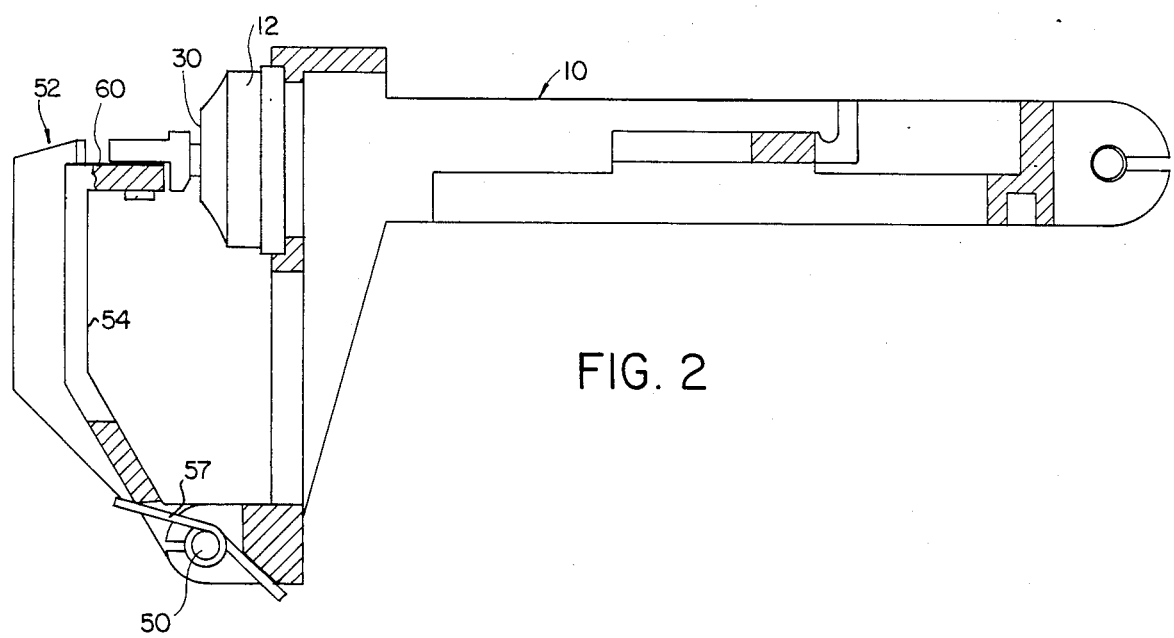
FIG. 2 is a side view elevation view partly in section, of the apparatus shown in FIG. 1.
Figure 3:
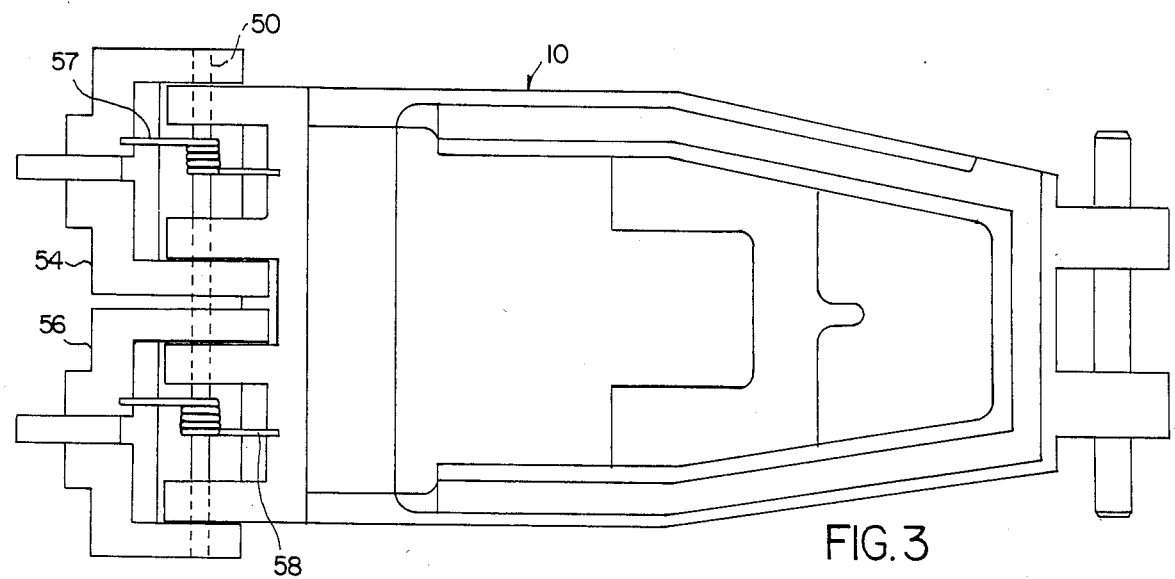
FIG. 3 is a bottom view of the apparatus shown in FIG. 1.

Attached to the head assembly end of the carriage 10 by way of a hinge 50 is a pressure pad support assembly 52 consisting of a pair of support arms 54 and 56. Each arm is resiliently biased toward the corresponding head assembly by a torsion spring 57, 58 having projecting ends in engagement with the carriage and support arm, as best seen in FIG. 2.

The arm 54 inludes at its upper end a horizontal flange 60 having an inner extremity including a projection 62. A vertically oriented tongue 64 on the projection 62 extends toward the support arm 56. In similar fashion, the arm 56 has a horizontal flange 66 in alignment with the flange 60 and a projection 68 on the flange 66 defining a vertical channel or groove 70 for receiving the tongue 64 thereby loosely coupling the support arms 54 and 56. In this connection, the groove 70 is somewhat wider than the tongue 64 allowing for a limited degree of relative motion between the arms 54 and 56 in a direction toward and away from the head assemblies. The loose connection between the support arms 54 and 56 provided by the mating tongue and groove assembly allows each support arm, within limits, to independently adjust for slight misalignments between the heads in relation to the nominal plane of the tape.

The arm 54 has an outwardly projecting extension 72 having a ramp-like cam surface 74 facing the tape; likewise, the arm 56 is provided with an extension 76 featuring a cam surface 78.

A pressure pad carrier 80 is mounted by means of a vertical pivot pin 82 on the horizontal flange of the support arm 54. Bonded to the carrier 80 is a pliable, rectangular pressure pad 84 having a face 86 confronting and spanning the head assembly apex 30 and engaging the non-oxide surface of the tape. The axis of the pivot pin 82 is in alignment with the vertical center line 42 of the head assembly 12, those axes lying in a vertical, central plane 88 disposed generally perpendicular to the tape path (FIG. 4). Adjacent the sides of the pressure pad carrier 80 and spaced a small distance therefrom are opposed limit surfaces 90 and 92 on the projection 62 and the extension 72, respectively, adapted to be contacted by the sides of the pivoted carrier 80. It will be seen that the pivoting action of the pressure pad carrier is thereby constrained to a relatively small angular displacement about the pivot pin 82 to one side or the other of the central plane 88.

The arm 56 supports an identical pressure pad assembly comprising a pressure pad carrier 100, pivot pin 102 and pressure pad 104 (with a face 106), this pressure pad assembly being disposed symmetrically about a vertical, central plane 108 including the pivot pin axis and vertical center line 42 of the head assembly 14. Limit surfaces 110 and 112 on the projection 68 and extension 76, respectively, constrain the rotation of the carrier 100 in a manner already described.

During operation of the tape drive, the tape 16 is initially drawn from the supply reel 18 (typically housed in a removable cartridge) by a leader which threads the tape through the various guide elements and onto the takeup reel 20. As explained in U.S. Pat. No. 4,477,851, the leader and tape are connected by a leader/type coupling mechanism comprising a ferrule on the lead end of the tape and a mating pin on the leader. As the leader/tape coupling mechanism approaches the head assemblies 12 and 14 during the threading operation, the mechanism contacts the cam surface 74 thereby urging the support arms 54 and 56 away from the head assemblies against the bias of the torsion springs 57 and 58 to permit passage of the coupling mechanism between the pressure pads and the heads. Rewinding of the tape onto the supply reel results in the same action, the leader/tape coupling mechanism in that case making initial contact with the cam surface 78.

During normal data transfer operation of the tape drive, with the tape moving in the direction indicated by the solid arrow in FIG. 4, friction between the pressure pads and moving tape causes the pressure pad carriers to tend to pivot counterclockwise as shown by the solid arrows superposed on the pressure pad carriers. This results in a pressure gradient or profile between the pressure pads and tape as shown by the solid line plots of pressure (P) vs. distance along the pressure pad face (D) in FIG. 4, with greater pressure being applied to the tape by the upstream or leading portions of the pressure pads (that is, to the left of the central planes 88 and 108 as seen in FIG. 4) than by the downstream or trailing portions of the pressure pads. The centers of pressure in this case will lie between the central planes 88 and 108 and the left hand extremities of the pressure pads as indicated by the solid lines 114 on the pressure/distance graphs in FIG. 4.

The opposite action takes place when the tape is driven from the takeup reel 20 to the supply reel 18, that is, from right to left as shown by the broken line arrow in FIG. 4. Here, the pressure pads tending to pivot clockwise and the pressure profile (shown in broken lines) is such that the righthand side of the pressure pads impose greater pressure on the tape. The center of pressure in this case lies to the right of the center planes 88 and 108, along the broken lines 116.

By thus applying greater pressure to the upstream or leading portions of the tape between the pressure pads and heads, any film of air is more effectively squeezed out assuring the greatest tape-to-head compliance.

Although the present invention has been described with reference to a particular preferred embodiment, it is contemplated that various alterations and modifications will become apparent to those skilled in the art after having read this disclosure. It is therefore intended that the appended claims be interpreted as covering all such alterations and modifications as fall within the true spirit and scope of the invention.

What is claimed is:

1. A magnetic tape data storage and drive apparatus comprising:

means for moving and guiding a magnetic tape for bidirectional travel along a tape path;

a pair of identical magnetic head assemblies, each assembly having a tape-engaging surface including a plurality of magnetic transducer pole faces defining a read/write gap and at least one erase gap, the read/write gap and the erase gap being spaced apart in the direction of tape travel;

a carriage supporting the magnetic head assemblies in side-by-side relationship along the tape path;

a pair of pressure pads associated with the magnetic head assemblies, each pad being positioned to engage the magnetic tape;

a carrier supporting each pressure pad; and means mounted on the head assembly carriage for supporting the pressure pad carriers, the supporting means being resiliently biased to bring the pressure pads into engagement with the magnetic tape and to urge the tape into contact with the tape-engaging surfaces of the magnetic head assemblies, each pressure pad carrier being pivotally mounted on the supporting means, whereby different portions of each pressure pad apply different levels of pressure to the tape depending upon the direction of tape travel, substantially optimum tape-to-head compliance being obtained irrespective of tape direction, the means supporting the pressure pad carriers comprising a pair of arms mounted on the head assembly carriage by a hinge, each arms supporting one of the carriers, each arm being independently biased toward the head assembly carriage by a torsion spring would about the hinge, and means coupling the arms to permit limited relative motion between the arms about the hinge.

2. An apparatus, as defined in claim 1, in which: said coupling means comprises a tongue projecting from one of the arms, said tongue being loosely received in a groove formed in the other arm.

3. An apparatus, as defined in claim 1, in which: the support arms include ramps extending in the direction of tape travel and in alignment with the pressure pads for engagement by the tape threading elements to move the support arms away from the head assemblies, against the bias of the torsion springs, to permit threading of the tape.

* * * * *